United States Patent [19]

Sola

[11] Patent Number: 4,917,428
[45] Date of Patent: Apr. 17, 1990

[54] BOTTLE CARRYING HANDLE

[76] Inventor: Manuel M. Sola, 885 Carlos Pellegrini St., (1338) Buenos Aires, Argentina

[21] Appl. No.: 926,105

[22] Filed: Nov. 3, 1986

[51] Int. Cl.$^4$ .............................................. B65D 71/00
[52] U.S. Cl. .................................. 294/87.28; 206/145; 206/201; 294/159
[58] Field of Search ....................... 294/27.1, 33, 87.2, 294/87.28, 137, 145, 153, 154, 159, 170; 206/139, 145, 147, 158, 199, 201, 427; 215/100 A

[56] References Cited

U.S. PATENT DOCUMENTS

| | | | |
|---|---|---|---|
| 211,004 | 12/1878 | Ferguson | 294/154 |
| 2,440,902 | 5/1948 | Lutey | 294/87.28 |
| 2,581,019 | 1/1952 | Heide | 294/87.28 X |
| 2,611,639 | 9/1952 | Sadeck | 294/87.2 |
| 4,248,470 | 2/1981 | Yuda et al. | 294/87.2 |

FOREIGN PATENT DOCUMENTS 77893  1/1951  Norway .............................. 294/87.2

Primary Examiner—Johnny D. Cherry

[57] ABSTRACT

A bottle carrying handle including a substantially irregular elongated body which is tubular-shape configurated at its middle part, the body having at least two ends, each end defining a hook carrying portion formed by a planar surface which is cut in a "U" shape configuration. The cut forms two supporting legs and each leg includes a bottle neck retainer. An apparatus for manufacturing the handle includes a plurality of moulds and countermoulds, each mould includes a "U" shaped central cavity and each leg of the "U" has a "U" shaped recess. One of the legs includes an "L" shaped recess which is aligned with respective projections provided in the associated countermould of the set, these projections are spaced apart by small spaces. Each countermould includes a block having a "U" shaped central cavity aligned with the cavity of the mould and each leg of the "U" includes horizontal "U" shaped projections aligned with the respective "U" recesses formed in the corresponding leg of the associated "U" shaped cavity of the mould.

5 Claims, 3 Drawing Sheets

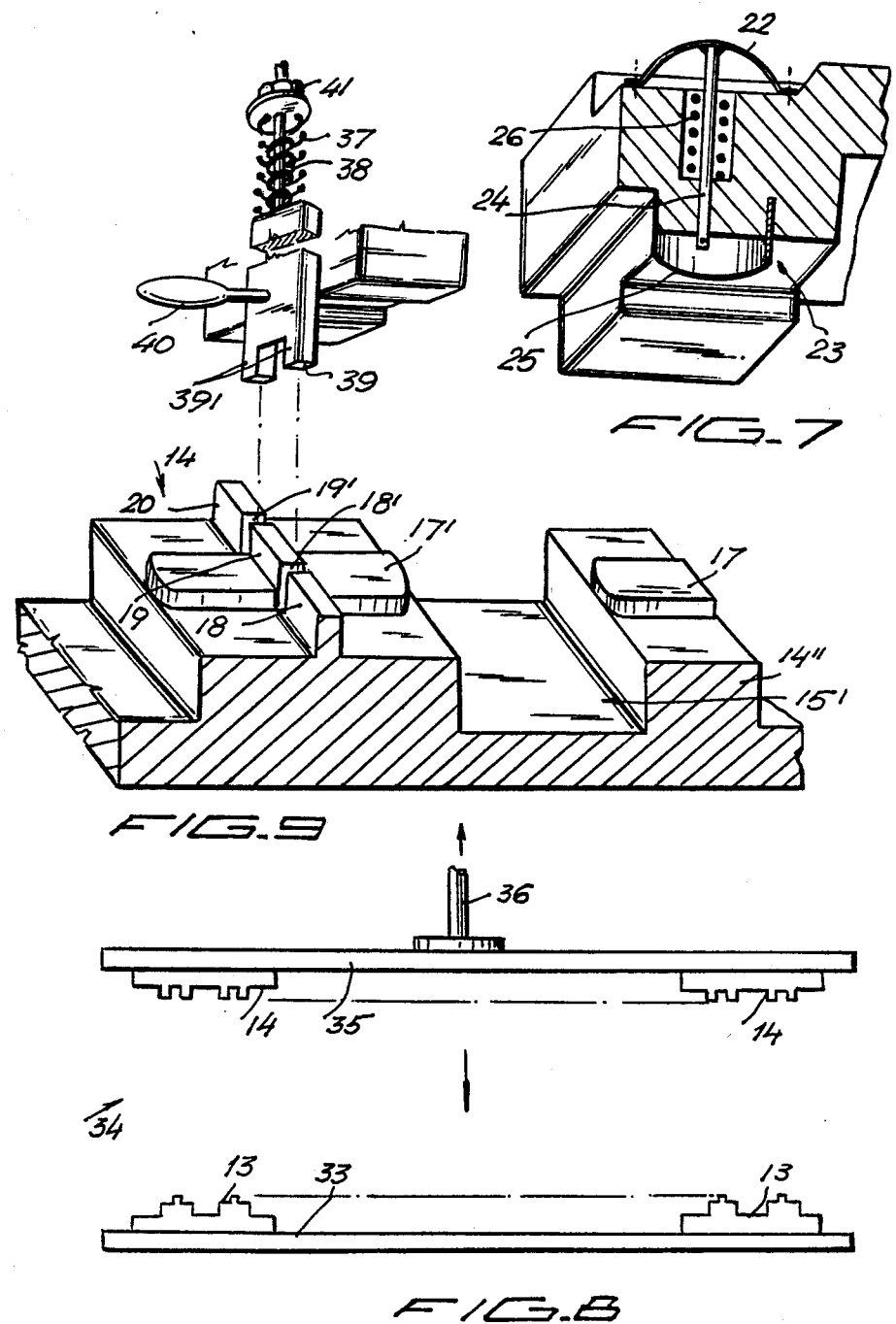

BOTTLE CARRYING HANDLE

BACKGROUND OF THE INVENTION

1. Field of the Invention

The present invention relates to a handle for carrying bottles and to an apparatus or system to manufacture it. In particular, it relates to a handle for carrying bottles containing gaseous beverages of the type comprising a plastic body having a neck including some kind of annular flange suitable to be supported by the handle. More particularly, the handle is adapted for bottles having a capacity of two liters. By handling of the bottle, it should be understood the handling by the user, in a house or outside, when he or she has to carry more than one bottle for personal use.

2. Description of the Prior Art

There are many handles for carrying bottles which are well-known, but the closest prior art existing in the market is a kind of handle that comprises an elongated body having at its respective ends corresponding hook formations capable of receiving the neck of a bottle in a fitting wedge relationship. The hook formations comprise two substantially parallel legs which are spaced apart from each other by a distance which is shorter than the diameter of the neck of the bottle. Thus, when the neck of the bottle is inserted between the legs, they open in order to permit the insertion of the neck between the legs.

This kind of handle was shown to be useful for bottles with a capacity less than ½ liters, but is inefficient for bottles of a capacity between 1 and 2 liters. When carrying the bottles by means of this kind of handle, such bottles tilt and the friction exerted by the legs on the neck of the bottle is insufficient to retain the neck in the handle, causing the bottle to fall therefrom. In order to overcome this problem, these handles were manufactured with a shorter separation between the legs, but as a consequence, the force necessary to insert the neck between the legs was increased. Of course, this is an important drawback, for example for old people and children when they have to carry bottles by means of this kind of handle.

Apart from this, the constructions suggested by the prior art are very complex. Some of the handles are manufactured from metal wires which have to be subjected to a plurality of forming steps, sometimes welding steps are necessary and of course, not only does a complex, structure result, but also the time and the manufacturing costs are increased.

BRIEF DESCRIPTION OF THE INVENTION

In order to overcome the above stated drawbacks, the present invention provides a bottle carrying handle which intends to improve the handling of some kinds of bottles, specially bottles containing carbonated or gaseous beverages, which are well-known and mass-used.

The bottle carrying handle proposed by the present invention is specially adapted for carrying bottles of the type of two liters, which are manufactured from plastic material and which include an annular flange around their necks. This annular flange is useful for picking up the bottle between the fingers.

The handle of the present invention is also useful for carrying glass bottles having a capacity of one liter and including a little annular flange around their necks, transportation of which is more troublesome. The weight of the empty glass container plus the weight of the content is equivalent to the weight of a full two-liters plastic bottle.

The present handle may carry one or more bottles depending on the quantity of carrying portions adapted to receive the neck of a bottle.

The present handle is also very cheap, considerably light in weight and its size is very small, while the resistant capacity to the several loads exerted by the bottles, when handled is very high. Several tests have demonstrated that the handle of the present invention is capable of supporting heavy weights, during long times, without deformation.

In comparison with the known handles, the present handle does not require a high insertion force. In fact, it does not require any force to insert the neck of a bottle into the hook or carrying portion thereof and in spite of movements the bottles may be subjected to during transportation, the neck of the bottle does not slip off the hook portion of the handle.

In order to obtain a very cheap handle, without manufacture disadvantages, the present invention also provides a system for manufacturing the handle. This system may be embodied by two alternative arrangements or apparatus embodiments which are based on the basic system. The apparatus allows a handle to be produced without high costs, a handle which may be disposable and broadly used, the manufacture thereof being easy and not complex like in the prior art.

The basic system uses a mould-and-countermould system. In a preferred manner, the moulds and countermoulds are joined by means of articulating means which allow them to pivot around one another, and to remain aligned during the moulding operation of the corresponding plastic material, for obtaining the handle of the invention.

Therefore, it is an object of the invention to provide a bottle carrying handle comprising a body central portion and at least two hook handling portions, each one adapted to receive a neck of a bottle, wherein the central portion comprises a substantially elongated body which, in its middle part, is defined by a rigid and tubular portion which is progressively flattened towards its respective ends in order to conform respective planar portions. Each planar portion has a "U" shaped cut defining a pair of supporting arms, like a hook, and each arm has neck retaining means.

According to another feature, the invention provides an apparatus for manufacturing bottle carrying handles, comprising a plurality of moulds and countermoulds for moulding a tubular plastic profile, wherein the moulds and the countermoulds form respective endless belts or chains pivotally connected to each other; each mould and each countermould is respectively connected with adjacent moulds and countermoulds by means of "U" shaped hinges; said chain of moulds and countermoulds being drivably mounted on corresponding wheels; the moulds including a central cavity having a "U" cross-sectional configuration and each leg of the "U" includes a respective recess also forming a "U". An inverted "L" shaped recess is provided adjacent one of the legs of the "U" of the cavity, which recess is aligned with respective parallelepiped projections provided in the associated countermould. These projections are coplanar with each other and are spaced apart by small spaces. Each countermould is defined by a block having a central cavity having a "U" cross-sectional configuration and said cavity is aligned with the respective cavity of the associated mould. Furthermore, a horizontal "U" shaped projection is provided on each of the legs of said "U" shaped cavity, which projection is aligned with the "U" shaped cavity on the leg of the "U" shaped cavity of the associated mould.

According to another feature, the invention provides an apparatus for manufacturing a bottle carrying handle, comprising a plurality of mould and countermould units for moulding a tubular plastic profile, wherein the mould units are formed by a block having a central cavity having a "U" cross-sectional configuration and each leg of the "U" includes a respective recess also forming a "U". An inverted "L" shaped recess is provided adjacent one of the legs of the "U" of the cavity, which recess is aligned with respective parallelepiped projections provided in the associated countermould. These projections are coplanar to each other and are spaced apart by little spaces. Each countermould is defined by a block having a central cavity having a "U" cross-sectional configuration and said cavity is aligned with the respective cavity of the associated mould. Furthermore, a horizontal "U" shaped projection is provided on each of the legs of said "U" shaped cavity, which projection is aligned with the "U" shaped cavity on each leg of the "U" shaped cavity of the associated mould.

BRIEF DESCRIPTION OF THE DRAWINGS:

FIG. 7 is a cross-sectional view along lines C—C of FIG. 6.

FIG. 8 is a schematic and side view of another embodiment of the apparatus of the invention, which comprises a manual apparatus.

FIG. 9 is a schematical side view of the manual apparatus, wherein the moulds and countermoulds form a press-like apparatus.

DETAILED DESCRIPTION OF THE PREFERRED EMBODIMENTS

Figure 1:
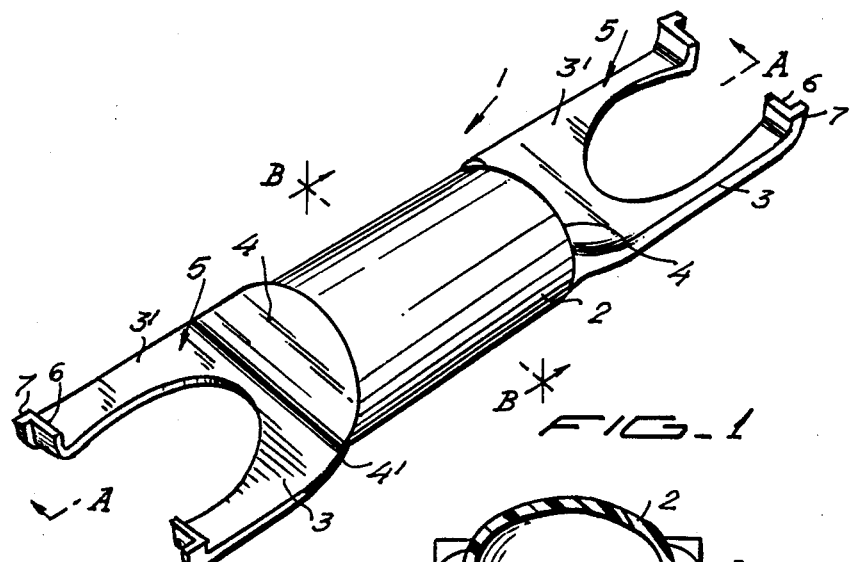
FIG. 1 is a perspective view of the handle of the invention.
Figure 2:
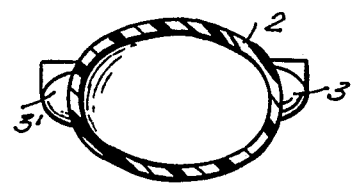
FIG. 2 shows a cross-section of the handle taken along lines B—B of FIG. 1.

When describing the different Figures, the same reference numerals indicate the same or corresponding parts, either of the handle of the invention, as well as of the pertinent apparatus embodiments.

Figure 3:
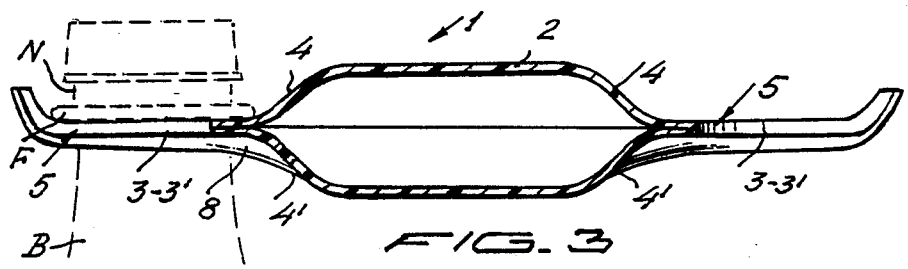
FIG. 3 shows a longitudinal-section of the handle taken along lines A—A of FIG. 1.
Figure 4:
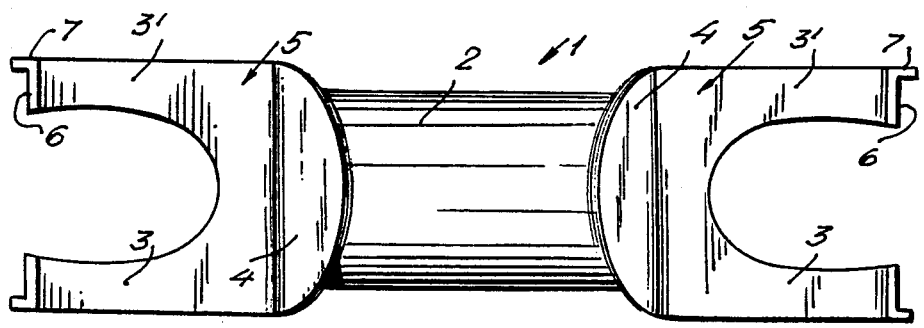
FIG. 4 is a plan view of the handle of the invention.

The handle of the present invention comprises a substantially irregular and elongated body 1, which in its central portion is preferably defined by a tube 2 having an elliptical cross-section ending in both ends thereof in corresponding two arms 3 and 3' forming a hook substantially extending along a plane, which plane is intended to be horizontal when transporting the bottles. In fact, said tube 2 is connected at its ends to corresponding sloped portions 4, 4' which in turn merge with a substantially planar surface 5, which is cut to form a "U"-shape configuration. This "U" configuration defines the cited hook with the above mentioned arms 3, 3' which are adapted to support the bottle B, by means of the annular flange F formed in its neck N (see FIG. 3). The arms 3, 3' will only support part of the bending stress, because the remainder part of this stress is supported directly by the sloped portions 4, 4' joining the tube 2 with the planar surface 5. Obviously the weight of the bottle is transmitted to the legs 3, 3' through the annular flange F. As stated above, the bottle illustrated in FIG. 3 is one of the many bottles which may be supported by the handle of the invention and therefore its illustration should not be considered as a limitation.

Arms 3, 3', opposite to the corresponding sloped plane portions 4, 4', include lugs 6, 6' normally projecting therefrom, and each lug is provided with a side projection 7, by means of which the cross-section of each lug 6 defines an "L" shaped section. Each side projection 7 is the continuation of a side rim 8, which constitutes a reinforcing rim providing the arms 3, 3' with a high resistance to the load exerted by the bottle, specially when in movement.

In spite of the small size of the present handle, the bottle carrying handle of the invention has a high resistance to the weight, which resistance, as stated, is provided by a central tubular portion 2 and the slope portions 4, 4', the latter being an important zone regarding the stresses to which the handle is subjected. The particular shape of the handle of the invention allows use of moulding steps which do not adversely affect the resistance capacity of the handle. For example, there are no openings of the type necessary to allow the passage of the tools to make or carve the hollow body of the prior art handles. Rims 8 and projections 7 are also important elements to contribute to the resistance capacity of the arms 3. However, the shape of the central portion, i.e. the tubular portion 2, is not to represent a limitation regarding an elliptical section, since same satisfactory results are obtained with tubes having other sections, such as, for example, a circular section. One condition to be fulfilled by the central portion 2 of the handle is for it to feel comfortable when held.

Although in the preferred embodiments, the hook portions formed by arms 3, 3' are illustrated as having lugs 6, it is also possible to replace the lugs by providing the planar surface 5 with a recess adapted to receive the annular flange F of the bottle B.

In any case, no force is necessary to place the neck N of the bottle B between the arms 3, since it is only necessary to insert the arms below the annular flange F, and then allow the flange F to rest on the legs. Once the annular flange F is resting on the arms 3, 3', the lug 6 stops the neck N from slipping off the arms 3, 3'.

In case a recess is provided on arms 3, 3', the annular flange F will rest within the recess, which will not permit the flange F to slide out of the hook portion.

According to another feature, the invention provides an apparatus for manufacturing the above described bottle carrying handle 1. The apparatus according to the present invention has proved to be the best means to obtain very good results in the structure of the handle with a moulded plastic material. In fact, the invention suggests a basic moulding system which may be embodied by either of two apparatus, one of which is an automatic and continuous apparatus and the other of which is a manual apparatus. Both of the embodiments use the mould and countermould system, in order to mould the tubular profile having thin walls obtained by extrusion. Both embodiments are intended to be used in different kinds of manufacturing companies, because the manual apparatus is rather convenient for small manufacturers, but the two apparatus allow the the same product quality to be obtained.

Figure 5:
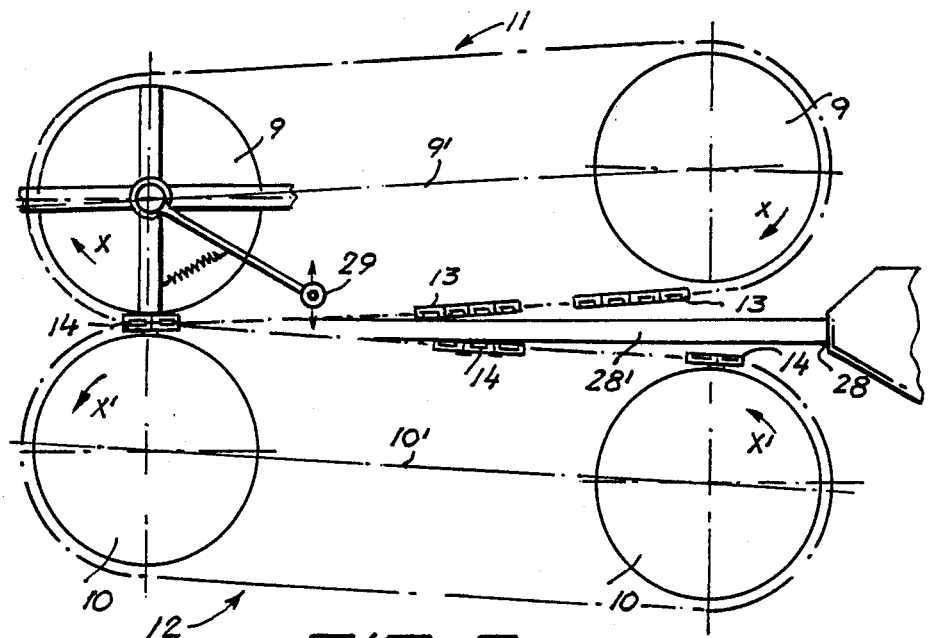
FIG. 5 is an schematic view of one preferred embodiment of the machine of the invention, which comprises a continuous operating machine to manufacture the handle of the invention.
Figure 6:
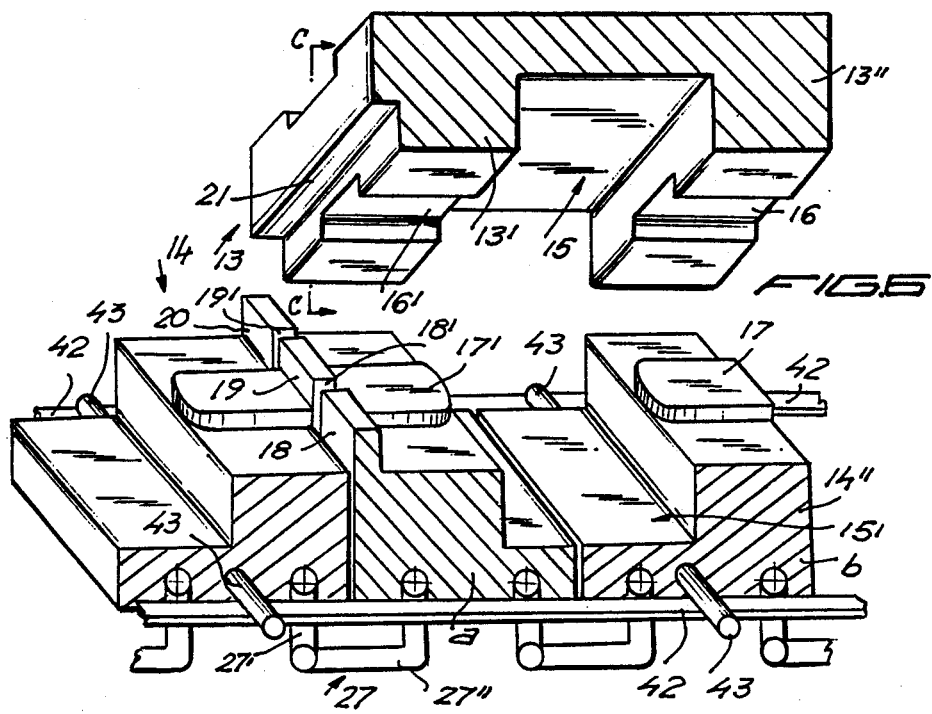
FIG. 6 is a perspective detailed and partially sectional view of one group of mould and countermould constituting the above preferred machine.

The continuous apparatus is shown in FIGS. 5 to 7. As can be seen, it comprises two pairs of wheels 9 and 10 and belts 11, 12 mounted therearound. Wheels 9 and 10 may be toothed wheels, gears or pulleys, whilst the belts 11, 12 may be chains. In fact, belts or chains 11, 12 are formed by a successive string of moulds 13 and countermoulds 14 which are duly interlinked as will be explained below. As may be appreciated, the centers of rotation of each pair of wheels 9 and 10 are respectively aligned along respective axes 9' and 10', forming a small angle. The direction or rotation of the wheels 9 and 10 is indicated by the arrows X—X'.

Due to the angle formed by axes 9' and 10' and to the movement of the wheels 9 and 10, the moulds and countermoulds will be intimately and complementarily engaged in a predetermined zone of the path defined by the chains 11, 12 in order to mould a tubular material 28' which is passed between the moulds 13 and countermoulds 14. The apparatus formed by the system of chains 11, 12 and wheels 9, 10 defines an inlet end for receiving the tubular profile 28' of plastic material, which is fed from an extruder 28 facing said inlet end. The outlet end defined at the opposite end forms a discharge for already moulded handles 1. At this end, the moulds 13 and the countermoulds 14, which were complementary engaged during a predetermined time, allow the handle to be formed and partially cooled within the cavity formed by the moulds.

Mould 13 has a substantially "U" shape configuration and defines, in its middle part, a cavity 15 which is capable of complementing cavity 15' defined in the countermould 14 when both parts are engaged. Both cavities define a quadrangular-section cavity.

Each leg of the "U" shaped mould 13 has recesses 16, 16' also having a "U" shaped configuration and which are the complement of the projections 17, 17' formed in the upper faces of the legs 14', 14" of the "U" shaped countermoulds 14.

In fact, each countermould 14 comprises two semi-parts a and b which are pivotally linked and form said countermould 14. The cited semi-part a of the countermould 14 includes three parallelepiped projections 18, 19 and 20 which are coplanar and spaced apart by small spaces 18' and 19'. These projections 18, 19 and 20, during the moulding process, are located in a shoulder or recess 21 formed in mould 13.

Mould 13 includes a flexible strip 22 in its upper part (see FIG. 7), within which and within the interior of mould 13, a cutting means 23 is located. This cutting means comprises a stem 24 connected to a cutting blade 25. The upward movement of stem 24 will be controlled by spring 26 whilst the downward cutting movement thereof will be produced by the flexible strip 22 which is actuated by a wheel 29 resiliently and downwardly urged in a known manner against strip 22. Wheel 29 is mounted in a suitable part of the apparatus as schematically shown in FIG. 5.

As stated above, each countermould 13 comprises two semi-parts a and b and they are connected to each other by means of a "U" shaped hinge 27. Each hinge 27 comprises a straight arm 27' which is articulated to the semi-part b of one of the countermoulds 13 and a second arm 27" which is articulated to said arm 27'. The second arm 27" is a crank-like arm which is articulated to the semi-part b of the same countermould 14. All the moulds and countermoulds which form the chains or belts 11 and 12 are pivotally interlinked to each other by similar hinges.

In order for each chain 11 and 12 to follow the correct path around the wheels 9 and 10, pertinent guides 42 are provided in the apparatus. Projecting pins 43 are located to both sides of the corresponding moulds 13 and countermoulds 14 and these pins slidably rest on the corresponding guide 42. These guides 42 extend at the sides of the chains 11 and 12, only in the paths of the chains which are rectilinear and horizontal, and particularly where the moulds and the countermoulds are joined to mould the tubular profile 28'.

The operation of the apparatus is as follows: while the chains or belts 11, 12 are rotating about the wheels 9 and 10, as indicated by arrows X, X', the moulds and countermoulds 14 will be carried along the endless paths defined by the chains 11 and 12. When the moulds and countermoulds 13 and 14 are in the paths which face each other, due to the angle formed by axis 9' and 10', each mould and countermould will draw towards each other in order to complementary couple. At the inlet end, where the extruder 28 is located, the tubular profile 28' is fed between the facing path defined by the moulds and countermoulds and therefore the tubular profile will be taken between the moulds. Since the tubular profile is fed in a soft heated state from the extruder 28, the tubular profile will be moulded when the moulds and countermoulds are coupled. The tubular profile 28', upon exiting the extruder 28, will slide on a table up to the moulds 13. Once the tubular profile 28' is taken between the first moulds, which are coupling to each other, the tubular profile will be tracked and the procedure will carry on continuously up to a point at the exit end of the apparatus where the moulds start to separate from each other in order to permit the removal of the already moulded handles.

The distance between the inlet end of the apparatus and the zone where the material is moulded is predetermined so that during said path, the material is in condition to be moulded.

Simultaneously, in the zone where the tube is being moulded between the moulds 13 and 14, the flexible strip 22 is engaged by a fixed stop consisting of a free rubber wheel 29 which causes the strip to move downwardly. Consequently, the stem 24 which is connected to the cutting blade 25 is moved downwardly, and the planar surface 5 is cut in order to form the "U" shaped hook portion, forming the arms 3, 3'.

Upon coupling of the moulds 13 and countermoulds 14, the zone of cavities 15, 15' will define the tubular central portion 2 of the handle. Cavities 16, 16' will be occupied by the projections 17, 17', said projections 17, 17' having curved edges to form the side rims 8 of the arms 3, 3', between the recess 16 and the projections 17.

The rim 8 is formed, as stated, between the recess 16 and the projection 17 due to the fact that the projections 17 have a width smaller than the width of the corresponding recess 16 and therefore, the plastic material is forced to the space formed between the projections 17 and the corresponding recess 16.

When projections 18 and 20 couple with the recess 21 the legs 6, 6' are formed which also are configured with the side projections 7. The sloped portion 4 is formed by the flattening produced in the tubular section to form the planar zone or planar surface 5.

Although the above described apparatus is very cheap and its use is very easy, a small manufacturer may prefer a manual apparatus which has a more straight forward construction.

Therefore, it is another object of the invention to provide a second embodiment of an apparatus for manufacturing the handle illustrated in FIG. 1. The second embodiment, as illustrated in FIGS. 8 and 9, comprises the same system of moulds and countermoulds, but in this case, the countermoulds are constituted by a unit fixed to a table 33. In turn, the moulds 13 also comprise a unitary or integral body which is located in a movable part 35. Both parts 35 and 33 form a press-like apparatus 34. In order to move the movable part 35 upwardly and downwardly, an operative stem 36 is provided which may be connected to any kind of known acting mechanism for moving the movable part 35 as indicated by the arrows. Of course, moulds 13 and countermoulds 14 are arranged in the corresponding fixed and movable parts 33 and 35 in order to complementary engage each other upon downward movement of the movable plate 35.

At each end of the movable part 35 there is a retaining device 39 which is spaced about 6 cm apart from plate 35. The device 39 is downwardly and elastically urged by a spring 37 located between the body of device 39 and a fixed plate 41 of the apparatus. Device 39 has to be moved upwardly, about 3 cm, by a handle 40 for permitting location of the tubular profile between parts 33, 35; and then it has to be moved downwardly in order to generate a first retention of the tubular plastic profile between the moulds and the countermoulds. The spring 37 exerts a first force of about 1 Kg.

Then the press is actuated and, when the movable plate 35 is moved downwardly, a force of a second spring 38 located axially within spring 37 and having a great resistance is transmitted to the profile. Then, when the profile is duly retained and located between the parts 33, 35, the moulding procedure starts. Thus the tubular profile is first retained by the device 39 and undue elongation thereof is avoided. The part of the tubular profile which enters the spaces 18' and 19' is pressed by the device 39 in order to form the rims 7 and 8, because the projections 39' have a smaller size than the spaces 18' and 19'.

To operate the apparatus manually, only one operator is necessary and he may operate simultaneously two apparatus of this manual kind, because while a press is occupied by the tubular profile and is waiting to be cooled, the operator may load another apparatus. As an example, a manual apparatus of this kind may have a capacity of 10 handles and bearing in mind that an operator may effect two moulding operations per minute, then he may make 1,200 handles per hour, which is practically impossible to do with other manual moulding means.

In order to make the handles thermoplastic, the tubular profile is immersed in a hot oil bath, which profile will be moulded without drying it and the oil which remains on the surface of the tubular profile will lubricate the moulds and will also easily allow the particular shapes like rims 8 and projections 7 to be obtained.

Although the essential features of the invention have been brought out by means of a preferred embodiment, the invention is not limited to this embodiment and extends on the contrary to all alternative forms within the purview of the appended claims.

I claim:

1. A bottle carrying handle comprising:
    an elongated body made of a rigid plastic material and having a central tubular portion and two planar ends connected to said central tubular portion by sloped portions,
    each of said planar ends having a pair of supporting arms for supporting an annular flange of a neck of a bottle, said supporting arms extending from said sloped portions and terminating in free ends, said supporting arms at each planar end being spaced apart from each other to define an opening therebetween for receipt of the neck of the bottle supported by said supporting arms and the spacing between said supporting arms at each planar end being sufficient for free movement of the neck of the bottle therebetween, and each supporting arm including neck retaining means for preventing the bottle supported by said supporting arms from slipping off of said supporting arms,
    each of said supporting arms also including a reinforcing rim extending along a length of said supporting arms on a side opposite to that which supports the annular flange of the bottle.

2. A bottle carrying handle as in claim 1, wherein said neck retaining means includes a lug formed at said free ends of each respective supporting arm.

3. A bottle carrying handle as in claim 2, wherein a side projection extends from each lug and defines an L-shape with said lug.

4. A bottle carrying handle as in claim 3, wherein said side projection is a continuation of said reinforcing rim.

5. A bottle carrying handle as in claim 1, wherein said central tubular portion has an elliptical cross-section.

* * * * *